United States Patent [19]

Sukarie

[11] Patent Number: 4,588,622
[45] Date of Patent: May 13, 1986

[54] FIBER-REINFORCED PRESSURE CONTAINER

[75] Inventor: George Sukarie, Karlsfeld-Rothschwaige, Fed. Rep. of Germany

[73] Assignee: M.A.N. Maschinenfabrik Augsburg-Nurnberg Aktiengesellschaft, Postfach, Fed. Rep. of Germany

[21] Appl. No.: 744,103

[22] Filed: Jun. 12, 1985

[30] Foreign Application Priority Data

Jul. 16, 1984 [DE] Fed. Rep. of Germany ....... 3426158

[51] Int. Cl.[4] .................. F17C 1/02; B65H 81/00
[52] U.S. Cl. .................................. 428/35; 220/3; 156/171; 156/172; 156/173
[58] Field of Search .................. 220/3; 156/171, 172, 156/173, 175; 428/35

[56] References Cited

U.S. PATENT DOCUMENTS

| 3,047,191 | 7/1962 | Young | 220/3 |
| 3,073,475 | 1/1963 | Fingerhut | 156/175 |
| 3,266,660 | 8/1966 | Ragettli | 220/3 |
| 3,367,815 | 2/1968 | Ragettli et al. | 156/175 |
| 3,750,823 | 8/1973 | Carter et al. | 220/3 |

Primary Examiner—John E. Kittle
Assistant Examiner—Thomas C. Saitta
Attorney, Agent, or Firm—Scully, Scott, Murphy & Presser

[57] ABSTRACT

The pressure container of fiber-reinforced resin having a cylindrical body and domed ends differs from designs proposed so far inasmuch as the reinforcing layer is not on the outside but on the inside of the wall in the form of lining, and is so placed as to overlap transitions between the domed ends and the cylindrical body of the container. This safeguards the transitions against damage by pressure-induced strains. For the production of such a pressure container the reinforcing layer is first produced and the rest of the container wall is formed on top of it.

8 Claims, 4 Drawing Figures

FIBER-REINFORCED PRESSURE CONTAINER

BACKGROUND OF THE INVENTION

The present invention relates to fiber-reinforced pressure containers or vessels and is more particularly concerned with the design of such containers to avoid excess strains due to the effect of internal pressure.

It is known that the strain in the middle, cylindrical part of pressure vessel with domed ends is greater than on the ends in the sense that the cylindrical part would deformed into the form of a barrel if it were not strong enough. In order to take this into account, pressure vessels of fiber-reinforced material have been designed so that the cylindrical middle part is provided with a casing to increase the resistance to pressure of this part of the structure between the domed ends. Such a casing is generally in the form of wound-on tape or thread material that is impregnated with synthetic resin.

A further relevant design consideration is that the transitions between the middle part and the domed ends of such a pressure vessel are particularly likely to be damaged by excess strain. It is however so far not proved feasible to reinforce the transitions by winding on backup material as used on the middle part, since if the winding were to be extended beyond the cylindrical middle part onto the domed ends, the wound material would tend to slip off because of the rounded shape of the domes. For this reason it has so far not been possible to reduce the pressure-induced strain load at the transitions between the domed ends and the middle part of a pressure vessel of the sort in question without the use of such complex methods and apparatus which would mean that the production of such pressure containers would no longer be an economic proposition.

SUMMARY OF THE PRESENT INVENTION

For this reason, one object of the present invention is to design a pressure container of fiber-reinforced resin, with a cylindrical middle part and domed ends and with a reinforcing layer for the middle part such that it effectively strengthens the transitions between the middle part and the domed ends and protects them against pressure-induced strains.

A still further aim of the present invention is to create a simple and easily performed method for the production of such pressure vessels.

In order to achieve these or other objects, a pressure container of the type in question is so made that the reinforcing layer is located on the inner side of the cylindrical middle part and lines the transitions between the middle part and the domed ends of the vessel.

In accordance with one form of the method of the invention, carbon fiber material impregnated with a thermosetting resin is wound in one layer or in superposed layers on a cylindrical mandril, thermosetting of the resin is caused by heating and the mandril is removed from the carbon-fiber-reinforced resin cylinder. Bowl-like mold members of a frangible material are pressed against the ends of the resin-carbon fiber cylinder, the outer curved faces of the mold members corresponding to the inner face of the domed ends to be produced. The mold members furthermore have edges with an annular cross section whose inner parts are able to be fitted against the end faces of the cylinder and furthermore outer parts, exceeding the outer diameter of the cylinder and having a chamfer. Elastomeric material is introduced into the space around the outer face of the cylinder and between the chamfered out parts of the annular edges of the molding and such elastomeric material is vulcanized. The wall of the pressure container is formed by helically winding a thread impregnated with thermosetting resin so that coils of the thread are adjacent to each other and at least two superposed layers of wound thread are formed. The resin is then cured and the bowl-like mold members are broken and removed from the interior of the container through openings in the wall thereof.

A more detailed account of the invention will now follow using the drawings.

DETAILED DESCRIPTION OF PREFERRED EMBODIMENTS

Figure 1:
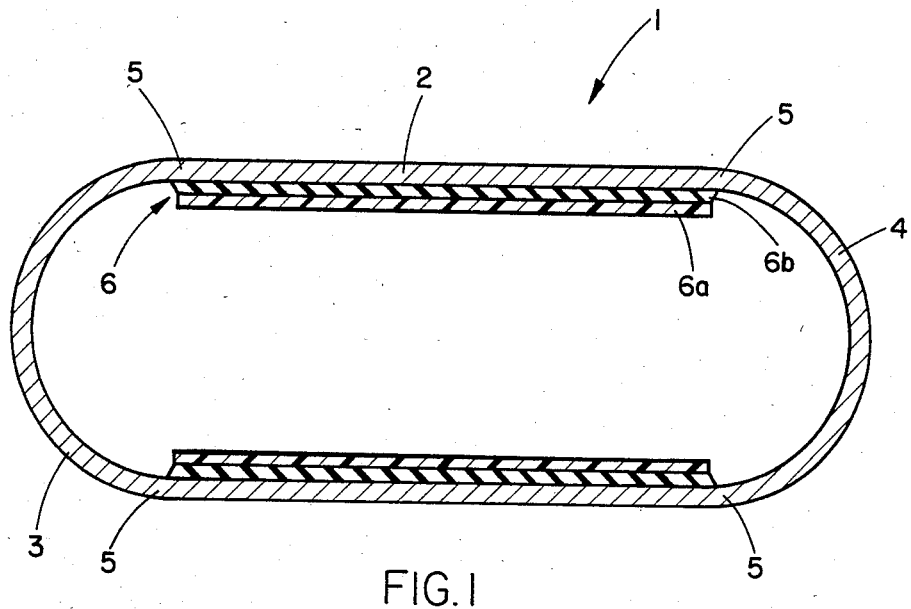
FIG. 1 is a diagrammatic representation of a pressure container in accordance with the invention in a longitudinal section to indicate a preferred form of the structure of the reinforcing layer.

FIG. 1 is a longitudinal section through a pressure container 1 in accordance with the invention, omitting the inlet and outlet connection pieces normally provided in the apices of the domed ends 3 and 4. The container as such is formed by the cylindrical body or middle part 2 and the domed ends 3 and 4. There are transitions 5 between the body 2 and the domed ends 3 and 4, but it is to be stressed that in the container produced in accordance with the present invention there are no joints between abutting components of the structure; and in fact the entire pressure container 1, that is to say the middle part and the domed ends, takes the form of a single coherent structure, as will furthermore be seen from the later account herein of the method steps for manufacturing the container.

On the inner face of the cylindrical body 2 of the container 1 there is a reinforcing layer 6, which, as will be seen from FIG. 1, lines the transitions 5. This constitutes an effective safeguard for the transitions against pressure loading.

Preferably the reinforcing layer is in the form of a layer 6a of carbon fibers bonded with thermosetting resin adjacent to the interior space of the container, and a layer 6b, placed between the wall 2 and the layer 6a, of elastomeric material. The thickness of the different layers of the wall members and the reinforcing layers of the container are exaggerated in the figure to make it more readily intelligible.

It is preferred for the carbon fibers of the layer 6a to be coiled helically and placed side by side and wound in one or more layers, this endowing the layer with a particularly high degree of strength and resistance to pressure.

An account will now be given of the preferred method of producing a pressure container in accordance with the invention, referring to FIGS. 2 through 4.

The first step is that of winding a carbon fiber thread impregnated with thermosetting resin on a cylindrical mandril in such a way that the separate coils or loops of thread so produced are closely adjacent to each other. The length of the coil will be aproximately equal to the length of the body of the pressure container. The winding may be in one or more layers, dependent on the desired thickness of the layer 6a to be produced.

The man in the art will know of a large range of thermosetting resins that may be used, the guiding principal being the intended use of the pressure container and more specifically what chemicals will come into contact with the layer 6a. As a general proposition however, it is possible for any thermosetting resin to be used with a slight preference being given to resins that cure under 150° and more particularly between 80° and 100° C.

The next step is the curing of the resin at the appropriate temperature. Thereafter the mandril is withdrawn from the wound package so that the product is a cured resin-carbon fiber hollow cylinder or package, which represents the layer 6a of the pressure container to be manufactured. This is made somewhat clearer by FIG. 2, in which the right of a hollow, cylindrical mandril 12 will be seen of a longitudinally sectioned arrangement, on which the cylinder 6a made of resin and carbon fibers is seated. After removal of the mandril this cylinder 6a will be ready as the first component of the pressure container.

The ensuing step is for bowl-like mold members 7 (FIG. 2) of frangible material to be produced. These mold members have—in a way similar to foundry operations—merely the function of endowing the structure to be produced with the desired form and after they have fulfilled this function they are broken or disintegrated. For performing the method of the invention a material will be used for the mold members that is preferably plaster of paris or another readily available material, which after being mixed in the form of a powder with water may be cast to form a fragile structure.

The bowl-like mold members 7 are so shaped that their outer curved faces correspond to the inner wall face of each domed end of the pressure container to be fashioned. Furthermore their annular edges 13 have inner parts 13a that are adapted to be fitted on the ends of the resin-carbon fiber cylinder 6a, and outer parts 13b, that project beyond the ends of the cylinder 6a and are chamfered (FIG. 2) frusto-conically.

Figure 2:
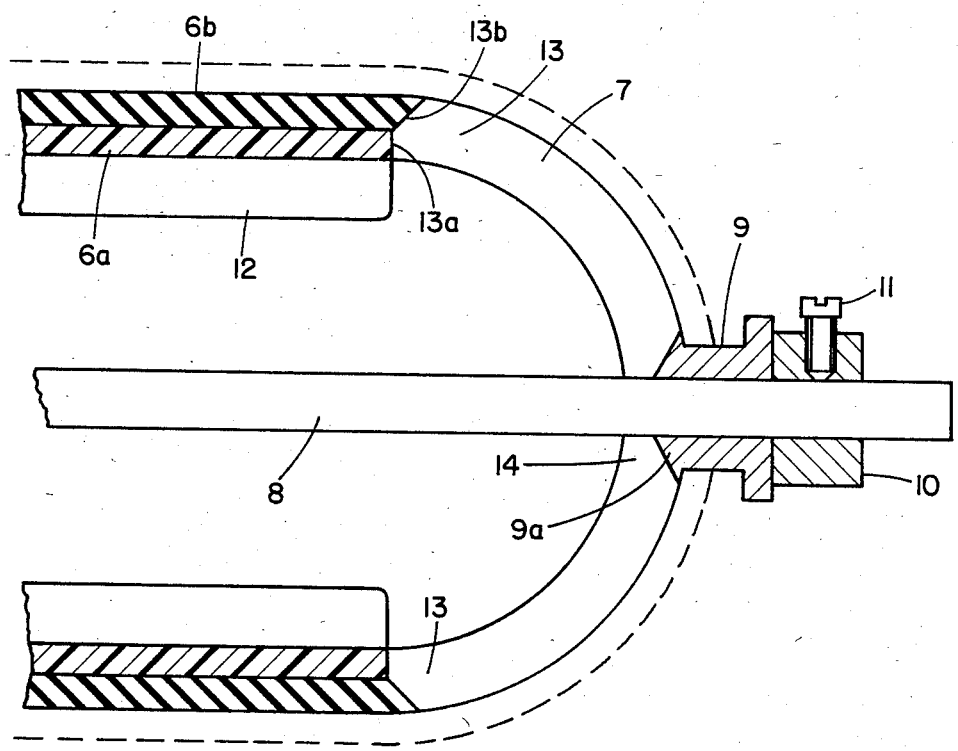
FIGS. 2-4 are views of different stages in the method of the invention for the production of such a pressure vessel.

The mold members 7 are pressed to the right and the left, respectively, against the ends of the cylinder 6a, the one on the right-hand end being indicated in FIG. 2. The pressing operation may take place using any suitable holding device. Since however it is necessary to have openings in the container for the supply and discharge of fluid under pressure therefrom, the bowl-like mold members 7 have openings at their apices 14 matching the eventual ports of the container and through which a support mandril 8 is inserted that has positioning rings 10 thereon. By clamping the positioning rings 10, using screws 11 in positions pressing the bowl-like mold members 7 against the end walls of the cylinder 6a and the mold members 7 are held together.

Before mounting the positioning rings 10 on the mandril 8 it is preferred to position connection pieces 9, that are preferably made of a metal such as aluminum, on the mandril. At their ends adjacent to the mold members 7 the connection pieces 9 each have a conical head 9a positioned in a conical wider part in the openings 14 of the mold members 7 and functioning as an anchor for holding the respective connection piece in the wall 3 and 4 of the domed ends of the container that are yet to be fabricated.

Elastomeric material is now introduced into the space around the outer wall of the resin-carbon fiber cylinder 6a and between the chamfered outer parts 13b of the present on mold members 7. The elastomeric material is then vulcanized. The vulcanized material then forms the elastomeric intermediate layer 6b of the container 1 to be produced.

Those in the art will also know of a large number of products that may be used as the elastomeric material, as for example natural rubber, different forms of synthetic rubber such as chloroprene, and in principle any type of elastomeric material may be used which is compatible with the fluid under pressure for which the container is to be used.

Figure 3:
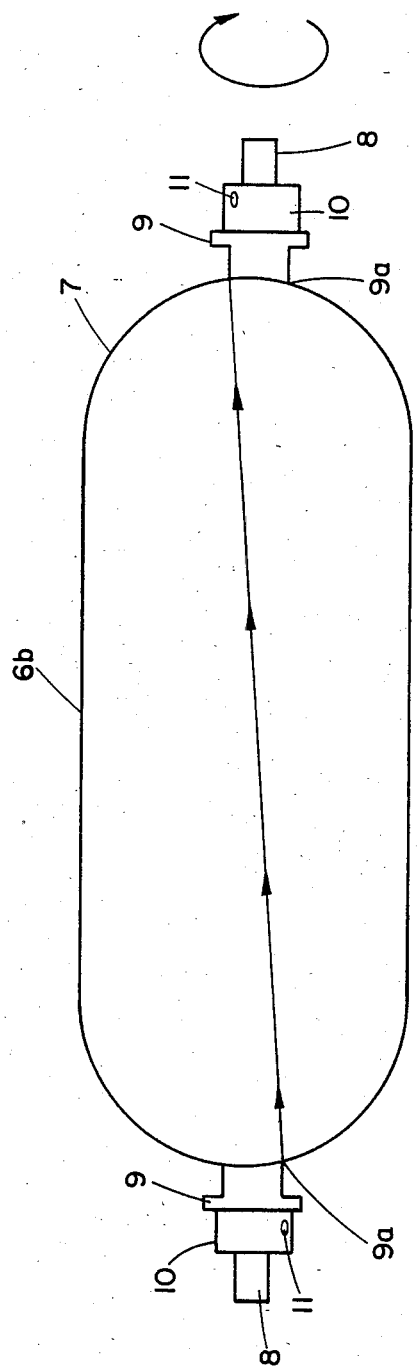
Figure 4:
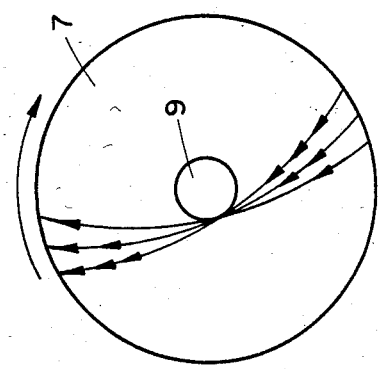

The structure resulting in this stage of the process is to be seen from the side in FIG. 3 and is delimited by the surfaces of the elastomeric layer 6b of the bowl-like mold members 7, the outer wall layer 2, 3 and 4 not having been so far produced. This wall layer is produced by winding thread impregnated with thermosetting resin helically and in a number of superimposed layers and curing the resin. As in bulding up the layer 6a, the thread material may be carbon fiber, but other forms of filaments or fibers such as glass fiber may be used. As regards the choice of the thermosetting resin, the same observations apply as were made in connection with the production of the layer 6a, the possible range being in fact even larger because the resin does not come into contact with the fluid for which the container is intended.

The threads are wound in coils with the closest possible packing, one layer being produced on top of the other until the desired thickness of the outer container wall 2, 3 and 4 has been produced. In this respect the term winding is intended to denote guiding the thread as shown in FIGS. 3 and 4. For example the one end of the impregnated thread is made fast to the foot of the left connection piece 9 at the bottom and then trained in the direction of the arrow over the surfaces of the mold member 7 and the layer 6b as far as the foot of the right connection piece 9 at the top, while the entire structure is turned about the longitudinal axis of the supporting mandril 8 in a clockwise direction at such a speed that the coils of the thread formed are placed side by side. The position of the threads may be seen from FIG. 4, that is a right end-on view of the structure as seen in FIG. 3. The course of the first thread coil on the two sides of the foot of the connection piece 9 is here marked by one arrow head, the second one by two arrow heads and the third one by three arrow heads. The spacing of the thread coils from each other is somewhat exaggerated in the figure to make it more straightforward. It will be seen that the threads run close together at the foot of the connection piece 9 so that the part 9a of the connection piece 9 is firmly anchored in the container wall 2, 3 and 4 in the process of being built up.

After the completion and curing of the container wall 2, 3 and 4, the positioning rings 10 are detached, the supporting mandril 8 is removed and the bowl-like mold members 7 of plaster of paris or some similar material are disintegrated. After clearing the fragments of the members from the interior via the openings of the connection pieces 9 the container in accordance with the invention is finished.

In the container of the invention it is not only a question of covering the transitions, which otherwise tend to form zones of weakness, when the container is subjected to pressure forces as explained hereinbefore, between the cylindrical body and the domed ends 3 and 4, but this reinforcing effect due to this guard layer is even further enhanced because the container wall 2, 3 and 4 of the pressure container of the invention forms an integral and coherent body and does not consist of a middle part with domed ends welded thereto. Lastly the coherence of the pressure container of the invention is even further increased by the shrinkage of the threads of the helical winding to a degree not so far experienced.

I claim:

1. A pressure container, comprising:
   an outside shell including
   (i) a central, cylindrical portion having first and second axial ends,
   (ii) first and second domed end portions located axially outward of and closing the first and second axial ends of the cylindrical portion, and
   (iii) first and second transition portions, the first transition portion axially extending between the first axial end of the cylindrical portion and the first domed end portion, and the second transition portion axially extending between the second axial end of the cylindrical portion and the second domed end portion; and
   a reinforcing section including
   (i) a cylindrical inner layer hving a substantially uniform radial width, and first and second open axial ends coplanar with the first and second axial ends, respectively, of the cylindrical portion, and
   (ii) a cylindrical outer layer radially positioned between and against the inner layer and the outside shell, and having first and second chamfered, axial end edges, said first and second chamfered edges slanting radially and axially outward, beyond the first and second axial ends, respectively, of the inner layer of the reinforcing section to reinforce the first and second transition portions of the outside shell.

2. A pressure container according to claim 1, wherein:
   the inner layer is comprised of a carbon fiber material bonded with a thermal set synthetic resin; and
   the outer layer is comprised of an elastomeric material.

3. A pressure container accordng to claim 2, wherein the carbon fiber material of the inner layer includes at least two layers of helically wound carbon threads.

4. A pressure container according to claim 1, wherein the outside shell includes a reinforcing layer of fibers bonded with a thermal set resin.

5. A pressure container according to claim 4, wherein the fibers comprise fiber threads.

6. A pressure container according to claim 5, wherein the fiber threads comprise at least one layer of helically wound fiber threads.

7. A method of producing a pressure container comprising the steps of:
   winding carbon fiber thread impregnated with thermosetting resin in at least one layer on a cylindrical mandril to form a tubular, cylindrical package,
   curing the said resin by heating it and withdrawing the mandril from the said package of thread and thermoset resin,
   positioning and pressing into place bowl-like mold members of fragile material on the ends of the said package composed of resin and thread, said mold members having outer dome-like faces answering to the desired shape of domed ends of the eventual container to be produced, said mold members further having annular rims with inner annular faces adapted to fit on the ends of said package, said rims further having outer annular faces that are chamfered to correspond to two frusto-cones decreasing in diameter towards the middle of the package and being greater in diameter than an outer cylindrical face of said package,
   forming a layer of resin precursor adapted to cure as an elastomeric resin on said outer face of said package so as to cover same and said chamfered annular faces of said mold members,
   curing said resin precursors to form said elastomeric resin,
   forming further wall structure of said container by winding a thread impregnated with thermosetting resin on an outer face of said elastomer in coils that are adjacent to each other and form at least two layers, and
   disintegrating said mold members into fragments and removing such fragments from the interior of the container through openings in the wall thereof.

8. The method as claimed in claim 7 wherein curing of said resin precursor to form said elastomeric resin is by vulcanisation thereof and connection pieces are fitted in apical regions of said domed ends.

* * * * *